Patented Mar. 27, 1928.

1,663,869

UNITED STATES PATENT OFFICE.

OTTMAR WAHL, OF LEVERKUSEN, GERMANY, ASSIGNOR TO GRASSELLI DYESTUFF CORPORATION, OF NEW YORK, N. Y., A CORPORATION OF DELAWARE.

DYESTUFFS OF THE TRIPHENYL METHANE SERIES.

No Drawing. Application filed April 26, 1927, Serial No. 186,830, and in Germany May 10, 1926.

My present invention relates to new dyestuffs of the triphenyl methane series.

I have found that by reacting with one molecule of a 4-benzylamino-benzaldehyde-3-sulfonic acid upon two molecules of an aromatic-ortho-hydroxy-carboxylic acid and subsequent oxidation there are obtained new dyestuffs which probably have the general formula

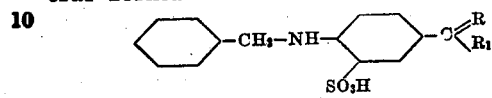

wherein R and R₁ are residues of aromatic-ortho-hydroxy-carboxylic acids. They are in a dry state reddish powders, difficultly soluble in water, soluble in caustic soda solution with a deep red color. They dye wool from an acid bath in weak reddish shades which are changed by afterchroming to bright red to violet-red shades of good fastness to light, to fulling and potting.

The following example will illustrate my invention, the parts being by weight:

*Example.*—29 parts of 4-benzylamino-benzaldehyde-3-sulfonic acid and 30 parts of ortho-cresotinic acid are dissolved in 300 parts of concentrated sulfuric acid of about 90% strength and stirred at a temperature of advantageously 30-35° until the aldehyde has disappeared. Then 15 parts of sodium nitrite are slowly added. The reaction mixture is poured over ice, the dyestuff separates and is filtered. In a dry state it is a red powder, difficultly soluble in water, soluble in caustic soda solution with a deep red color. It corresponds probably to the formula

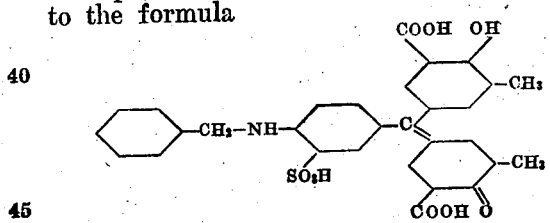

It dyes wool from an acid bath weak reddish shade, which by afterchroming is changed to an intensely purple red.

In the above example one can use instead of ortho-cresotinic acid other aromatic ortho-hydroxy-carboxylic acid compounds as for instance salicylic acid or α-hydroxynaphthoic acid.

I claim:

1. New dyestuffs corresponding probably to the general formula

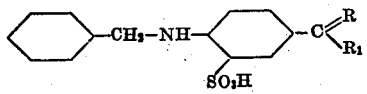

wherein R and R₁ are residues of aromatic ortho-hydroxy-carboxylic acids which are in a dry state reddish powders, difficultly soluble in water, soluble in caustic soda solution with a deep red color, dyeing wool from an acid bath in weak reddish shades, which are changed by afterchroming to bright red to violet-red shades of good fastness to light, to fulling and potting, and which may be obtained by reacting with one molecule of a 4-benzylamino-benzaldehyde-3-sulfonic acid upon two molecules of an aromatic ortho-hydroxy-carboxylic acid and subsequent oxidation.

2. A new dyestuff corresponding probably to the formula

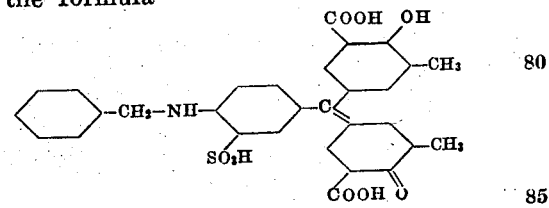

which is in a dry state a red powder, soluble in caustic soda solution with a deep red color and dyeing wool from an acid bath weak reddish shades which by afterchroming are changed to an intensely purple red, and which may be obtained by reacting with one molecule of 4-benzylamino-benzaldehyde-3-sulfonic acid upon two molecules of ortho-cresotinic acid and subsequent oxidation.

In testimony whereof, I affix my signature.

OTTMAR WAHL.